United States Patent [19]
Barcock et al.

[11] Patent Number: 5,773,207
[45] Date of Patent: Jun. 30, 1998

[54] PHOTOGRAPHIC EMULSIONS

[75] Inventors: Richard A. Barcock, Stansted Mountfitchet; Rachel J. Hobson, Great Dunmow, both of England

[73] Assignee: Imation Corp., Oakdale, Minn.

[21] Appl. No.: 767,464

[22] Filed: Dec. 16, 1996

[30] Foreign Application Priority Data

Jan. 9, 1996 [GB] United Kingdom ............... 9600396

[51] Int. Cl.$^6$ ................. G03C 1/043; G03C 1/035
[52] U.S. Cl. ................. 430/567; 430/569; 430/637
[58] Field of Search ............... 430/567, 569, 430/637

[56] References Cited

U.S. PATENT DOCUMENTS

| | | | |
|---|---|---|---|
| 3,567,458 | 3/1971 | Milton | 430/592 |
| 3,850,641 | 11/1974 | Horigome et al. | 430/527 |
| 4,144,069 | 3/1979 | Yoneyama et al. | 430/444 |
| 4,298,674 | 11/1981 | Land et al. | 430/213 |
| 4,658,065 | 4/1987 | Aoshima | 564/487 |
| 4,943,520 | 7/1990 | Yoneyama | 430/527 |
| 5,147,771 | 9/1992 | Tsaur et al. | 430/569 |
| 5,147,772 | 9/1992 | Tsaur et al. | 430/569 |
| 5,147,773 | 9/1992 | Tsaur et al. | 430/569 |
| 5,171,659 | 12/1992 | Tsaur et al. | 430/569 |
| 5,210,013 | 5/1993 | Tsaur | 430/567 |
| 5,236,817 | 8/1993 | Kim | 430/503 |
| 5,252,442 | 10/1993 | Dickerson et al. | 430/502 |
| 5,252,453 | 10/1993 | Tsaur et al. | 430/569 |
| 5,284,980 | 2/1994 | Pruckmayr et al. | 568/617 |
| 5,439,787 | 8/1995 | Yamanouchi | 430/567 |
| 5,595,863 | 1/1997 | Yamanouchi et al. | 430/567 |

FOREIGN PATENT DOCUMENTS

| | | | |
|---|---|---|---|
| 513726-A1 | 5/1992 | European Pat. Off. | G03C 1/035 |
| 515895 | 5/1992 | European Pat. Off. | G03C 7/30 |
| 6-308644 | 11/1994 | Japan | G03C 1/015 |
| 6-332090 | 12/1994 | Japan | G03C 1/015 |
| 7-072572 | 3/1995 | Japan . | |
| 7-072573 | 3/1995 | Japan | G03C 1/07 |
| 7-072574 | 3/1995 | Japan | G03C 1/07 |
| 7-098482 | 4/1995 | Japan | G03C 1/07 |
| 7-140578 | 6/1995 | Japan . | |
| 1525902 | 3/1976 | United Kingdom | G03C 1/08 |
| 2283977 | 10/1993 | United Kingdom | C08G 65/32 |

OTHER PUBLICATIONS

Polymer Sci. Ser. B, vol. 36, No. 3, 1994, pp. 412–414.

*Primary Examiner*—Mark F. Huff
*Attorney, Agent, or Firm*—Arlene K. Musser

[57] ABSTRACT

Tabular gain silver halide emulsions prepared in the presence of a block copolymer selected from the group consisting of:

A—B, A—(B—A)$_m$, B—(A—B)$_m$, (A—B)$_p$—X, (B—A)$_p$—X, [A—(B—A)$_m$]$_p$—X, and [B—(A—B)$_m$]$_p$—X where m is an integer of 1 or more, p is an integer of 3 or more, X represents a p-valent linking group, A represents a poly(tetrahydrofuran) block, and B represents a poly(ethylene oxide) block.

16 Claims, No Drawings

PHOTOGRAPHIC EMULSIONS

FIELD OF THE INVENTION

The invention relates to photographic emulsions and in particular to photographic emulsions comprising tabular grains and a block copolymer which have surfactant properties and may be used to modulate silver halide grain morphology.

BACKGROUND TO THE INVENTION

It is often desirable to control the variations in crystal morphology of tabular g in silver halide emulsions. In particular, there are advantages shown by monodisperse silver halide emulsions such as a tendency to show better contrast and higher mean grain quantum efficiency in imaging. There are a number of reasons for the improved properties shown by monodisperse emulsions. The optimum conditions for the chemical sensitisation of the tabular grain will be similar. Non-conforming grain tend to interact differently with light on exposure compared to tabular grains. Tabular grains cause less light scattering than non-tabular grains and hence can give images having higher resolution. Non-tabular grins may also disrupt the parallel alignment of the tabular gains with the base during the coating and drying process. Needed-type grains (rods) may promote chemical fog, possibly by mechanical stress and frictional heating. Thus, there are dear advantages in generating uniform, monodisperse tabular grain emulsions for high speed photographic materials. "Monodisperse" grain populations are characterised by a low value for the coefficient of variation (COV), i.e., the value obtained by dividing the standard deviation of grain diameters by the mean grain diameter. The diameter of the grains is defined as the diameter of the circle having an area equal to the projected area of the grain as viewed in an electron micrograph of an emulsion. The value thus obtained is usually multiplied by 100 and expressed as a percentage. For tabular grain emulsions, a COV of <20% is considered very low, and a COV of <10% extremely low. The thickness of the grain is shown by the distance between the two major parallel f of the tabular grain. The term "aspect ratio" is the ratio of the diameter of the tabular grain to the thickness thereof, and is usually expressed as a ratio of two numbers, e.g., 5 to 1 or 8 to 1.

Previously, compounds containing ethylene oxide units either as small or polymeric analogues have been used to control the variations in crystal morphology of tabular grains because these compounds may act as face selective grain growth modifiers. The use of block copolymer surfactants (sold under the tradename Pluronic™ by BASF) has been found to lower the COV and minimise the proportion of nonconforming grains in tabular emulsions, as described in U.S. Pat. No. 5147771 and U.S. Pat. No. 5171659. The relevant copolymers comprise poly(ethylene oxide) chains (which have hydrophilic and argentophilic properties) linked to higher poly(alkylene oxide) chains, such as poly (propylene oxide), which are more hydrophobic. Low COV grain size emulsions have been prepared by incorporation of these polymers in low quantities into the make kettle prior to nucleation. These compounds not only have an affect on reducing the COV but also the grain size, when compared with the control makes not containing Pluronic™ surfactants.

Delaying the introduction of the Pluronic compound into the make until after the formation of the silver halide nuclei containing twin planes (when about 25% of the total silver has been added) can still result in low COV emulsions. U.S. Pat. No. 5,252,453 discloses that precipitation can be accelerated whilst maintaining the low dispersity of the total grain population which leads to an increase in the grain size obtained. Other alkylene oxide block copolymer variants have been described for use as grain growth modifiers in tabular grain emulsion makes. For example, U.S. Pat. Nos. 5,147,772 and 5,147,773 disclose poly(alkylene oxide) block copolymers containing at least three terminal hydrophilic or lipophilic block units each linked through a central amine functionality block linking unit.

This low COV emulsion technology has been disclosed for use in various product applications. For example, EP-A-513726 discloses an improved phototypesetting paper which utilises low COV (<15%) tabular grain exhibiting higher contrast and speed when compared with similarly constructed phototypesetting papers in which tabular grains possessing the "usual" wide COV's are employed. EP-A-515895 discloses a multicolour photographic element capable of forming a viewable reversal dye image for which a low COV (<15%) tabular grain AgX emulsion has been used. The advantages realised include an enhancement of image sharpness and contrast Improvements in speed and reductions in granularity were also achieved with the monodisperse tabular grain emulsions.

EP-A-514742 discloses the preparation of very low COV (<10%) tabular grain emulsions by employing numerous poly(alkylene oxide) block polymers, which are suitable for use in radiographic films. Limiting the grain dispersity reduced the imaging variance of the emulsions, indicating a more uniform grain response and higher mean grain efficiencies.

EP-A-514743 refers to the use of poly(alkylene oxide) block polymers for the formation of low COV tabular gains for use in the spectrally sensitised emulsion layers of colour negative type films with the advantage of improved sharpness within these layers as well as in any underlying layers, owing to the reduced proportion of non-tabular grains with high light scattering effects. Improved speed/granularity ratios were observed, and it was suggested that by simply increasing the grain size of the low COV emulsion, a higher speed would be observed for a given granularity level.

U.S. Pat. No. 5,252,442 discloses a spectrally sensitised double-sided X-ray type film containing a filter dye underlayer, in which both the front and back emulsions contain tabular AgX s with COVs of less than 15%, by utilising Pluronic™ surfactants in the emulsion make procedure. The monodisperse AgX tabular gain emulsion layer contributes to an improvement in the detected quantum efficiency of the radiographic element.

Poly(alkylene oxide) type polymers have been used to yield low COV (usually <15%) tabular grain emulsions. For example, EP-A-633494 discloses the preparation of silver halide emulsions in the presence of certain polyethyleneglycol (PEG) methacrylate copolymers giving grains with good graniness, speed to fog ratio and sharpness. These tabular grains are stated to be not only monodisperse but of a very uniform hexagonal form which gives the improved photographic properties stated above. Similarly, block copolymer of poly(siloxane) type and poly(siloxane) ether polymers have been disclosed in JP-A-07072574 to generate tabular grain emulsions of low dispersity with reduced graininess. JP 07072573 discloses a gelatine-graft polymer comprised of poly(ethylene oxide) units to provide tabular gain emulsions of good dispersity.

JP 07072572 discloses that polyurethanes act as grain growth controllers in the preparation of monodisperse tabular grain emulsions. These tabular grain emulsions have been found to have COV's of <20% with reduced graininess and high sensitivity. JP 07098482 discloses improved tabular grain emulsions, prepared by utilising a vinyl polymer comprising a polyurethane monomer, and vinyl monomer comprising polyurethane and optionally substituted poly (ethylene glycol. The emulsion has been demonstrated to be of uniform dispersity and of good granularity and high sensitivity. A low COV tabular grains emulsion has also been disclosed in JP 06332090, generated in the presence of a polyalkylene oxide polymer, giving tabular grains with good sensitivity and graininess.

Poly(alkylene oxide) polymers have been used for other applications in silver halide films. U.S. Pat. No. 3,567,458 discloses that alkylene oxide block copolymers act as effective development restrainers at much reduced levels in lithographic type emulsions than usual restrainers, like poly (ethylene glycol), applied in the art These development restrainers are seen to increase contrast and improve halftone quality significantly in these film types.

U.S. Pat. No. 4298674 discloses polyethers as decolourising agents in diffusion transfer films and processes.

Alkylene oxide block polymers disclosed in EP-A-288059 in photographic films reduce the anti-static properties without causing any staining of processing solutions and rollers in development procedures. For example, there are dear advantages seen with X-ray film which are suitable for use in passing readily through automatic developing machines. Use of poly(ethylene oxide) block polymers as anti-static agents is also disclosed in U.S. Pat. No. 3,850,641 and EP-A-154 799. However, these latter examples of anti-static additives have been probatively associated with conveyor roller stain in development processes.

Poly(tetrahydrofuran) polymers and poly(alkylene oxide)s are both classed as aliphatic polyethers (see reference: *Macromelecules* 2, H-G. Elias, Plenum Press, p 938, 1983) even though they have different main chain repeat units.

Poly(alkylene oxide)s are formed when alkylene oxides (also called epoxides or oxiranes) are subjected to ring opening polymerisation, which is normally initiated by a nucleophile *Encyclopedia of Polymer Science and Engineering*, 2nd Edition, Wiley, Vol 6, p. 227). This gives a polymer with a structure as follows:

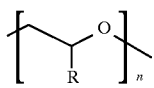

When R=H in the above formula, the polymer is poly (ethylene oxide), while when R=CH$_3$ the polymer is poly (propylene oxide), and so on. Poly(ethylene oxide) terminated by OH at each chain end is also known as poly (ethylene glycol (PEG).

Two or more alkylene oxides may be copolymers either in a random manner or in sequence to form block copolymers of which the commercial Pluronic™ materials are examples (see reference: Booth et al., *Macromolecules*, 27(9), 2371, (1994) for procedures).

Poly(tetrahydrofuran), on the other hand, can only be prepared by cationic polymerization of tetrahydrofuran, which is in turn prepared by the hydrogenation of maleic anhydride (see reference: *Macromolecules* 2, H-G Elian, Plenum Press, p. 939,1983).

The structure of these materials is as follows:

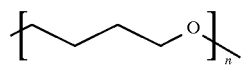

THF may also be copolymerised cationically with oxirane or with diols, as disclosed in EP-A-158229 and in *Polymer Science, Ser.B*, 36(3), 1994, pp. 412–414, the products being random copolymers. Block copolymers comprising poly (THF) sequences have been prepared (U.S. Pat. No. 5,284, 980) by reacting hydroxy-terminated poly(THF) with a glycol in the presence of a strong acid catalyst In some cases, PEG was used as the glycol, giving rise to block copolymers comprising poly(THF) sequences and poly(ethylene oxide) sequences, but from the molecular weights of the relevant products, it is clear that they contained an average of at least two blocks of each type per polymer chin.

U.S. Pat. No. 5,147,771, U.S. Pat. No. 5,147,772, U.S. Pat. No. 5,147,773, and U.S. Pat. No. 5,252,453 disclose copolymers having a lipophilic alkylene oxide block linking unit which contains repeating units satisfying the formula:

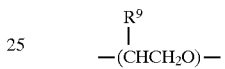

where $R^9$ is a hydrocarbon of from 1 to 10 carbon atoms, and hydrophilic alkylene oxide block linking unit contains repeating units satisfying the formula:

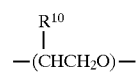

where $R^{10}$ is a hydrogen or a hydrocarbon of from 1 to 10 carbon atoms substituted with at least one polar group.

GBA-2,283,977 discloses block copolymer surfactants comprising one or more poly(ethylene oxide) blocks and one or more polyohigher alkylene oxide) blocks, at least some of the blocks being linked by an oxyrnethylene group. The block copolymers are prepared by reaction of the appropriate polymeric diols with dichloromethane in the presence of base. There is no mention of photographic use.

GBA-1525902 discloses an image-forming method comprising development processing of an imagewise exposed lith-type silver halide photographic material in the presence of at least one block copolymer represented by the following general formula (1):

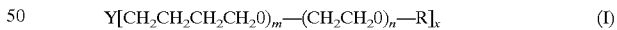

wherein Y represents an organic residue of valency x, R represents a hydrogen atom or an alkyl group containing 1 to 18 carbon atoms, m is an integer of from 5 to 50, n is an integer of from 10 to 100, and x is an integer of from 1 to 3 and/or of the general formula (II):

wherein b is an integer of from 8 to 50 and a and c are integers and the sum of a+c is from 5 to 100;

the polyoxyethylene moieties comprising 10 to 70% by weight of the total weight of the copolymer.

JP07-140578 discloses a photographic emulsion which comprises tabular grains formed in the presence of at least one polyester made by reacting a diol compound with a dicarboxylic acid or performing ting opening copolymerisation of a cyclic ether and lactone. One of the polyesters disclosed is a tetrablock copolymer of tetrahydrofuran/ ethylene oxide/delta-valerolactone/ethylene oxide.

JP06-308644 discloses photographic emulsions having tabular grains which contain a poly(ethylene oxide) block copolymer having hydrophobic poly(alkylene oxide) units and hydrophilic poly(alkylene oxide) units. All of the specific copolymers disclosed comprise blocks of poly(ethylene oxide) and blocks of polypropylene oxide).

BRIEF SUMMARY OF THE INVENTION

According to a first aspect of the invention, there is provided a silver halide photographic emulsion comprising tabular silver halide grains and a block copolymer which is a member selected from the group consisting of:

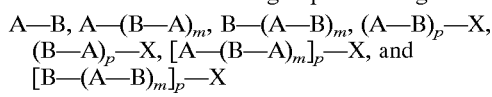

[B—(A—B)$_m$]$_p$—X where m is an int of 1 or more, p is an integer of 3 or more, X represents a p-valent linking group, A represents a poly(tetrahydrofuran) block, and B represents a poly(ethylene oxide) block

DESCRIPTION OF PREFERRED EMBODIMENT

Block copolymers suitable for use in the invention include both linear and star-shaped polymers.

Blocks represented by A preferably have a degree of polymerisation in the range 2–100, more preferably in the range 5–30. Blocks represented by B comprise ethyleneoxy repeating units, and preferably have a degree of polymerisation in the range 2–100, more preferably in the range 5–30.

The poly(ethylene oxide) blocks B are hydrophilic, whereas the poly(tetrahydrofuran) blocks A are relatively hydrophobic, and the block copolymers therefore exhibit a balance of hydrophilic and hydrophobic properties.

Linkages connecting the blocks A and B to each other and/or to X are preferably provided by direct bonds, but alternatively may be provided by divalent linking groups provided said linking groups are of negligible molecular weight in comparison to the molecular weights of the blocks A and B, and do not markedly influence the hydrophobic-hydrophilic balance provided by the blocks A and B. Suitable linking groups within these parameters include carbonyl, methylene, phenylenedicarbonyl, phenylenedicarbarnoyl, alkylenedicarbonyl and alyllenedicahamoyl.

Likewise, the terminal groups at the ends of the polymer chains are preferably of negligible molecular weight in comparison to the molecular weights of the blocks A and B, and do not markedly influence the hydrophobic-hydrophilic balance provided by the blocks A and B. Suitable terminating groups include hydrogen, lower alkyl of 1 to 4 carbon atoms (especially methyl), phenyl and the like.

In the case of star-shaped copolymers, the central linking group X may in principle be any group of valency 3 or more, but again preference is given to groups of negligible molecular weight in comparison to the molecular weights of the blocks A and B, which do not markedly influence the hydrophobic-hydrophilic balance provided by the blocks A and B. Suitable examples include aromatic rings, nitrogen atoms, >NCH$_2$CH$_2$N<, etc.

Preferred block copolymers have the structure A—B—A or B—A—B, and are described in greater detail hereinafter.

The block copolymers are freely compatible with aqueous media and exert a strong surfactant effect, and hence are useful in the preparation of silver halide photographic emulsions. The preparation of silver halide photographic emulsions typically involves the mixing of aqueous solutions of silver nitrate and one or more alkali metal halides in the presence of gelatin with vigorous stirring Generally speaking, the more vigorous the siring the greater the efficiency of mixing but above a certain speed, air entrainment may occur, which leads to foaming and a consequent decrease in the efficiency of mixing. Hitherto, the problem has been avoided by lowering the stirring speed and/or adding an antifoaming agent such as ethanol at periodic intervals, neither of which represents an adequate solution to the problem However, it has been found that the block copolymers described above, when added to the emulsion making kettle in a quantity corresponding to at least 5 mg per mole of silver in the final emulsion, act as effective antifoaming agents and permit rapid stirring to be carried out without excessive build-up of foam. While there is no particular upper limit to the amount of copolymer to be added, amounts in excess of about 600 mg per mole of silver provide little extra benefit The block copolymers find particular use in the preparation of tabular grain emulsions, which may be defined as emulsions in which the grains have an average aspect ratio (i.e. the ratio of grain diameter to thickness) of at least 3. When the block copolymers are added at the appropriate stage in the manufacture of such emulsions, they are unexpectedly found to enable the growth of highly monodisperse grain populations.

Therefore, according to a second aspect of the invention, there is provided a method of making a tabular grain emulsion comprising the sequential steps of:

(a) providing a solution of bromide ions and dispersing medium in an emulsion-making kettle or reaction vessel;

(b) adding a solution of silver ions to said solution of bromide ions to form a population of silver halide nuclei;

(c) optionally ripening said population of silver halide nuclei; and (d) adding further silver ions and halide ions so as to form a population of tabular silver halide characterised in that prior to step (b) and/or step (d), there is added to the kettle a block copolymer as defined above. Preferably the block copolymer is added in an amount ranging from 5–200 mg per mole of the silver added during the preparation of the emulsion.

The dispersing medium is preferably gelatin. Essentially any photographic grade of gelatin may be used, including non-oxidised gelatin. Comparable prior art methods for the generation of monodisperse tabular grain populations, such as those described in U.S. Pat. No. 5,171,659, U.S. Pat. No. 5,252,453, U.S. Pat. No. 5,147,771/2/3, EP0514742 and EP0633494, may require different process conditions during the make (such as pH or the presence or absence of iodide ions at various stages) depending on whether oxidised or non-oxidised gelatin is used. Such constraints do not apply to the present invention.

The bromide solution of step (a) typically has a concentration in the range 0.3–0.001M (corresponding to a pBr from about 0.5 to 3.0), the counterion being an alkali metal (e.g., potassium), ammonium or similar counterion.

The population of nuclei is preferably formed at a temperature in the range 40°–60° C. by adding a solution of silver nitrate while maintaining an excess of bromide ions. Preferably, the pBr is in the range 0.5–3.0 during nucleation, more preferably in the range 0.7–1.4. This is typically achieved by the simultaneous addition of further bromide ion by a balanced double jet technique.

The ripening in step (c) may be carried out by introducing a pause in the make procedure, often accompanied by an increase in the temperature of the kettle contents and/or the addition of ammonia or some other silver halide solvent, as is well known the art. The purpose of a ripening pause is to promote Ostwald ripening of the grains and hence provide a more monodisperse population of seed grains on which subsequent growth takes place. A ripening pause is typically (but not exclusively) included in emulsion makes in which nucleation is carried out at a relatively high pBr (e.g., above about 1.3). When nucleation is carried out at a low pBr, the excess bromide exerts a solvent action, and Ostwald ripening ray be sufficiently rapid that a separate ripening period is unnecessary.

Further growth to form the final tabular grain population is most readily achieved by one or more periods of balanced double jet addition of further silver nitrate and alkali metal halide. Any halide selected from bromide, chloride and iodide, or mixture of halides, may be used during the final growth period. The halide composition may also be changed at one or more points during this growth period to give a core-shell structure. However, the use of pure bromide, or bromide mixed with up to 3.0 mole % iodide, is preferred.

After grain growth is complete, the emulsion may be coagulated, washed and sensitised (both chemically and spectrally) in accordance with standard techniques.

The block copolymer is preferably added to the kettle during step (a), and additional quantities are optionally added during step (c). The presence of the block copolymer causes a dramatic reduction in the dispersity of the resulting grain population. For example, in a make procedure that gives rise to an emulsion of COV 20% in the absence of the block copolymer, the addition of the polymer can reduce the COV to less than 10%. A further beneficial effect is a substantial reduction in the number of "nonconforming" grain such as needle-type grains.

Needle-type grains (rods) tend to be generated during the formation of tabular grains, especially with those grains generated at lower pBr's(<1). These rods are highly undesirable for the various reasons specified above. Therefore, any method which eliminates or significantly reduces their presence is desired. The polyether grain growth modifiers of the present invention have been shown to be very effective in virtually eliminating or at least significantly reducing rod-like grains found during the preparation of tabular grains even with an emulsion initially generated at a pBr of as low as 0.82.

In the examples of emulsion makes in the patents where Pluronic 31R1 ™ was used (e.g., EP 514 742; U.S. Pat. No. 5,171,659; U.S. Pat. No. 5,252,453; U.S. 5,147,771/772/ 773; EP 633 494A), the nucleation pBr's were generally between 1.4 and 3.5, with the range pBr 1.62 to 1.97 being more commonly applied. The poly(THF) compounds of the present application are capable of controlling the COV at much lower pBr ranges for nucleation, e.g., as low as 0.82. This is a more demanding test as the effects of Ostwald ripening become much more predominant at lower pBr's due to the higher bromide ion concentration.

It has been found that tabular grain emulsions of relatively low COV and low needle-grain content can be prepared in the absence of ammonia or other silver halide solvents when block copolymers of the invention are present Ammonia is frequently added during the ripening phase of the preparation of tabular grain emulsions, as described in U.S. Pat. Nos. 4,801,522, 5,028,521 and 5,013,641, for example. It is believed that ammonia accelerates the process of Ostwald ripening and leads to a more uniform population of seed grain . This in turn leads to a reduced proportion of non-conforming grains and a narrower distribution of grain sizes in the final emulsion. The resulting grains are typically larger and thicker than comparable grain grown from seeds ripened in the absence of ammonia Surprisingly, it has now been found that the block copolymers in accordance with the invention have an effect equivalent to that of ammonia in terms of eliminating needle-grains and reducing the COV of the population. For a given amount of silver added during the growth phase, the average grain size is smaller than that of grains grown from ammonia-ripened seeds.

Block copolymers which are particularly preferred for use in the invention have a triblock structure. The structure A—B—A is new and represents a further aspect of the invention.

The polymer compositions of the invention may be synthesised by g out conventional coupling reactions on precursor polymers corresponding to the blocks A and B. Said precursor polymers comprise the same repeating units as the blocks A and B and additionally comprise a reactive functionality at at least one of the chain ends. Precursor polymers corresponding to the central block of the A—B—A or B—A—B structure must comprise a reactive functionality at both chain ends. Suitable reactive functionalities are nucleophiles (such as —OH, —NH$_2$ and —SH) or electrophiles, which include labile esters (such as methanesulphonates, tosylates, triflates, trifluoroacetates), carboxylic acids, acid chlorides and isocyanates.

Synthesis of the triblock copolymers may be achieved by reaction (in the appropriate stoicheiometric proportions) of A-block precursor polymers having one or more nucleophilic end groups with B-block precursor polymers having one or more electrophilic end groups. Alteratively, the synthesis may equally well be achieved by rating A-block precursor polymers having one or more electrophilic end groups with B-block precursor polymers having one or more nucleophilic end groups.

Precursor polymers having —OH groups at one or both chain ends are widely available commercially (e.g., from Aldrich Chemical Company Limited, Gillingham, England). For example, poly(THF) diol is available from the aforesaid supplier in a variety of well-defined molecular weights, and exemplifies a precursor polymer for the A-blocks. Likewise, poly(ethylene glycol) and the corresponding monomethyl ether are available from the same supplier in a range of molecular weights, and exemplify precursor polymers for the B-blocks. The nucleophilic hydroxy groups on any of these polymers may be converted to electrophilic functionalities by standard methods. For example, reaction with methanesuiphonyl chloride, tosyl chloride or tifluoroacetyl chloride, gives the corresponding labile ester groups, which readily undergo nucleophilic displacement reactions.

Thus a preferred route to the B—A—B polymers involves preparation of the bismethanesulphonate of poly(THF) diol, and reaction of the same with PEG monomethyl ether in the presence of strong base. Because a difunctional A-block precursor is reacting with a monofunctional B-block precursor, there is no risk of unwanted chain extension beyond the desired triblock stage. The process may be summarised as:

(where Ms=methanesulphonyl)

Similarly, a preferred route to A—B—A copolymers may be summarised as:

2HO—A—OH+MsO—B—OMs→A—B—A+2MsOH

In this case, both reagents are difunctional, and unwanted chain extension to tetrablock and higher systems (A—B—A—B—. . . . etc.) is possible in theory. In practice, however, by careful stoicheiometric control and the use of relatively dilute reaction media, such unwanted side reactions may be minimised or eliminated entirely, and the desired triblock copolymer obtained in high yield and purity.

A less-preferred alternative to the labile ester route described above involves reaction of hydroxy-terminated precursor polymers with difunctional electrophiles such as phosgene, dichloromethane, bis(acid chlorides), diisocyanates and the like in order to form precursor polymers terminated by electrophilic groups. In the conversion of polymeric diols to the corresponding bis(electrophiles), care must be taken to use a large excess of difunctional electrophile and/or a dilute reaction mixture to avoid chain extension reactions. The resulting precursor polymers having terminal electrophilic group(s) are then condensed with the appropriate hydroxy-functional precursor polymers in the appropriate stoichiometric proportions to give the desired triblock copolymers. In this manner copolymers in which the A— and B—blocks are linked by groups such as carbonyl, methylene, phenylenedicarbonyl, phenylenedicarbamoyl, alkylenedicarbonyl, alkyienedicarbamoyl, are produced.

Preparation of Poly(THF)PEG Block Co-Polymers

Well defined block copolymers of poly(THF) and PEGs were prepared using similar coupling procedures to those described in C. Selve et al., Synth. Comm., 20(6), 799, 1990.

An example of the procedure used to prepare poly(THF/PEG block copolymers is given below for a block copolymer having a lipophilic-hydrophilic-lipophilic arrangement Block copolymers having a hydrophilic-lipophilic-hydrophilic arrangement can also be prepared by coupling the bis-(methanesulphonate) poly(THF) compound with two equivalents of PEG.

Poly(tetrahydrofuran) (0.01 mol), Mw 1,000, was dissolved and anhydrous THF (50 ml). To this solution was then added crushed potassium hydroxide pellets (11.2 g. After 15 minutes, a solution of PEG 600 bis (methanesuphonate) (0.005 mol) in anhydrous THF (20 ml) was added to the former solution and the reaction was heated under reflux at 65° C. for 48 hours.

The excess potassium hydroxide and methanesulfonic acid were separated from the reaction mixture by filtration. The solid was washed with a further 20 ml of THF to ensure that all the product was in the filtrate. Evaporation of the solvent yielded a viscous liquid which, on standing, crystallised into a waxy solid. GPC, $^{13}C$ and $^{1}H$ NMR spectra were consistent with the desired product (an ABA block copolymer). In particular no peaks were found corresponding to unreacted PEG methanesulphonate. The GPC of this material, measured in THF on a column pre-calibrated using poly(styrene) standards, showed that a material (8.47 g), with an average molecular weight of 2,607 was present Only one peak was seen for this material confirming that the subunits had coupled into an ABA-type structure.

A mixture of poly(THF) and PEG compounds synthesized by essentially the same procedure were also analysed by the same GPC system and found to give multiple peaks.

EXAMPLES PREPARED

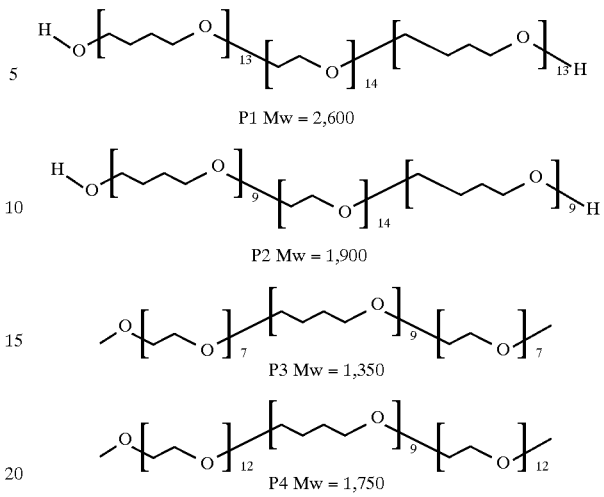

P1 Mw = 2,600

P2 Mw = 1,900

P3 Mw = 1,350

P4 Mw = 1,750

A number of silver halide tabular grain emulsions were prepared and the characteristics of each emulsion are given in Table 1 below.

Example 1 (Control)

Kettle Contents: Gelatine (12.5 g of Rousselot 1183), water (2160 ml), 4M $HNO_3$ (5.5 ml), and potassium bromide (12.6 g 105.9 mmol) was added to a 10 liter kettle to give a solution pBr of 1.31 and a pH of 2.00.

Nucleation: The temperature of the kettle solution was brought to 45° C. and a dispersator head was rotated at 4500 rpm. 35 ml of a 1.96M solution of silver nitrate (68.6 mmol, 2.16% of the total silver added) and 35 ml of a 1.96M solution of potassium bromide (68.6 mmol) were simultaneously added by the double jet technique over a period of 33 seconds.

Ripening Pause: After a flier 37 seconds of mixing at 45° C., the temperature of the kettle was raised to 70° C. over 20 mins. Fifteen minutes into the temperature ramp, a mixture of $(NH_4)_2SO_4$ (10.0 g 75.8 mmol) in 2.5M NaOH (80.0 ml) was added to the kettle (to give a pH~10.5). After a further 5 mins., the kettle contents were neutralised to pH 6.85 with 4M $HNO_3$(25 ml). A solution of 75% phthalated gelatine (47.5 g) in water (475 ml) was added to the kettle contents and the mixture allowed to stir for a further 10 mins.

First Growth Stage: A 1.96M solution of silver nitrate (21.6 ml, 42.4 mmol, 1.39% of total silver added) was added at 7.5 m/min over 2 min 53 seconds to raise the pBr to a value of 1.63 (−56 mV). Under pAg control (at −56 mV), 405 ml of a 1.96M solution of silver nitrate (794 mmol, 25.5% of the total silver added) and the corresponding solution of 1.96M potassium bromide were added simultaneously at a linear rate from 7.5 ml/min. to 20.8 ml/min. over 28 min and 39 seconds.

Second Growth Stage: A 1.96M solution of silver nitrate was added by a single jet at a pump rate of 7.5 ml/min. to raise the pAg from −56 mV to −1SrnV. This required about 2.6% of the total silver added. Under pAg control (at −1SmV), 439 ml of a 1.96M solution of silver nitrate (860.4 mmol, 27.7% of total silver added) and the corresponding solution of 1.96M potassium bromide were added simultaneously at a linear rate from 7.5 ml/min. to 26.25 ml/min. over 26 min. After this period of time, and under this same pAg control (−15 mV), 645 ml of a 1.96M solution of silver nitrate (126 mol, 40.6% of total silver added) and a corresponding mixture of a 1.92 M solution of potassium bromide and a 0.04M solution of potassium iodide were added simultaneously at a linear rate from 27 ml/min. to 37.5 ml/min. over 20 min. The emulsion was then cooled to 45° C. and precipitated using procedures well known in the arm The tabular grains obtained by this procedure were mostly hexagonal in shape, and had the following charactistics:

Average Grain Equivalent Circular Diameter: 1.30 μm

Average Grain Thickness: 0.19 μm (average aspect ratio of 6.8:1)

Coefficient of Variance (COV) for the Tabular grains: 20%

(Overall COV for all Grains: 23%

Projected Area of Tabular Grains: 98.5%

Population of Tabular Grains: 95%

EXAMPLE 2

Example 1 was repeated, except that (0.20 g) poly(THF) block copolymer (P1) surfactant, having a molecular weight of 2,600 and a lipophilic-hydrophilic-lipophilic arrangement, was additionally present in the reaction vessel prior to the nucleation step, and also added during the further addition of gelatine after the temperature ramp (0.30 g). The sur surfactant constituted 6.7% by weight of the total silver added up to the beginning of the post-ripening grain growth step and 0.16% by weight of the total silver introduced in the emulsion overall.

The tabular grains obtained by this procedure were mostly regularly hexagonal in shape and had the following characteristics:

Average Grain Equivalent Circular Diameter: 0.97 μm.

Average Grain Thickness: 0.24 μm (average aspect ratio of 4:1)

Coefficient of Variance (COV) for the Tabular grain population: 7%

(Overall COV for all Grains: 9%

Projected Area of Tabular Grains: 98.5%

Population of Tabular Grains: 97%

Example 2a

Example 1 was repeated, except that a reduced amount of the poly(THF) block copolymer (P1) surfactant having a molecular weight of 2,600 and a lipophilic-hydrophilic-lipophilic arrangement, was additionally present in the reaction vessel prior to the nucleation step (0.10 g), and also added during the further addition of gelatine after the temperature ramp (0.15 g). The structure constituted 3.4% by weight of the total silver added up to the beginning of the post-ripening grain growth step and 0.08% by weight of the total silver introduced in the emulsion overall.

The tabular gains obtained by this procedure were mostly regularly hexagonal in shape and had the following characteristics:

Average Grain Equivalent Circular Diameter: 1.10 μm

Average Grain Thickness: 0.193 μm (average aspect ratio of 5.7:1)

Coefficient of Variance (COV) for the Tabular grain population: 8%

(Overall COV for all Grains: 10%

Projected Area of Tabular Grains: 98%

Population of Tabular Grains: 96%

Example 3

Example 1 was repeated, except that poly(THF) block copolymer (P4), a surfactant with a hydrophilic-lipophilic-hydrophilic arrangement and having a molecular weight of 1,750, was additionally present in the reaction vessel prior to the nucleation step (0.20 g), and also added during a further addition of gelatine after the temperature ramp (0.30 g). The surfactant constituted 6.7% by weight of the total silver added up to the beginning of the post-ripening grain growth step and 0.16% by weight of the total silver introduced in the emulsion overall.

The tabular gains obtained by this procedure were mostly regularly hexagonal in shape and had the following charactistics 0:

Average Grain Equivalent Circular Diameter: 0.82 μm

Average Grain Thickness: 0.34 μm (average aspect ratio of 24:1)

Coefficient of Variance (COV) for the Tabular grain population: 8%

(Overall COV for all Grains: 10%)

Projected Area of Tabular Grains: 98%

Population of Tabular Grains: 96.3%

Example 3a

Example 1 was repeated, except that a reduced amount of the poly(THF) block copolymer (P4) surfactant with a hydrophilic-lipophilic-hydrophilic arrangement and having a molecular weight of 1,750, was additionally present in the reaction vessel prior to the nucleation step (0.10 g) and also added during the further addition of gelatine after the temperature ramp (0.15 g). The surfactant constituted 3.4% by weight of the total silver added up to the beginning of the positioning g growth step and 0.08% by weight of the total silver introduced in the emulsion overall.

The tabular grain obtained by this procedure were mostly regularly hexagonal in shape and had the following characteristics:

Average Grain Equivalent Circular Diameter: 1.10 μm

Average Grain Thickness: 0.194 μm (average aspect ratio of 5.7:1)

Coefficient of Variance (COV for the Tabular gain population: 16%

(Overall COV for all Grains: 17%)

Projected Area of Tabular Grains: 99%

Population of Tabular Grains: 97%

Example 4

Example 1 was repeated) except that poly(THF) block copolymer (P2) surfactant, having a molecular weight of 1,900 and a lipophilic-hydrophilic-lipophilic arrangement, was additionally present in the reaction vessel prior to the nucleation step (0.20 g), and also added during the further addition of gelatine after the temperature ramp (0.30 g). The surfactant constituted 6.7% by weight of the total silver added up to the beginning of the post-ripening grain growth step and 0.16% by weight of the total silver introduced in the emulsion overall.

The tabular grains obtained by dais procedure were mostly regularly hexagonal in shape and had the following charactistics:

Average Grain Equivalent Circular Diameter: 0.83 μm

Average Grain Thickness: 0.306 μm (average aspect ratio of 2.7:1)

Coefficient of Variance (COV for the Tabular grain population: 12%
(Overall COV for all Grains: 12.5%)
Projected Area of Tabular Grain: 99.2%
Population of Tabular Grains: 98.6%

Example 5

Example 1 was repeated, except that poly(THF) block copolymer (P3) surfactant, having a molecular weight of 1,350 and a hydrophilic-lipophilic-hydrophilic arrangement, was additionally present in the action vessel prior to the nucleation step (0.20 g), and also added during the further addition of gelatine after the temperature ramp (0.20 g. The surfactant constituted 5.4% by weight of the total silver added up to the beginning of the post-ripening grain growth step and 0.13% by weight of the total silver introduced in the emulsion overall.

The tabular grains obtained by this procedure were mostly regularly hexagonal in shape and had the following characteristics:
Average Grain Equivalent Circular Diameter. 1.00 $\mu$m.
Average Grain Thickness: 0.206 $\mu$m (average aspect ratio of 4.9:1)
Coefficient of Variance (COV for the Tabular grain population: 10%
(Overall COV for all Grains: 15%)
Projected Area of Tabular Grains: 98%
Population of Tabular Grains: 95%

Example 6 (Comparative Example)

Example 1 was repeated, except that Pluronic™31R1 (B3ASEF) (W 3,200) (shown below) was additionally present in the reaction vessel prior to the nucleation step (0.21 g), and also added during the further addition of gelatine after the temperature ramp (0.30 g). The surfactant constituted 6.8% by weight of the total silver added up to the beginning of the post-ripening grain growth step and 0.16% by weight of the total silver introduced in the emulsion overall.
HO—$(CH(CH_3)CH_2O)_x$—$(CH_2CH_2O)_y$—$(CH_2CH(CH_3)O)_{x'}$—H Pluronic™ 31R1
where x and x' are greater than 6: ethylene oxide block (y) from 4 to 96% of the total block copolymer.

The tabular grains obtained by this procedure had the following characteristics:
Average Grain Equivalent Circular Diameter 1.25$\mu$m
Average Grain Thickness: 0.18 $\mu$m (average aspect ratio of 6.9:1)
Coefficient of Variance (COV for the Tabular grain population: 18%
(Overall COV for all Grains: 19%)
Projected Area of Tabular Grains: 99%
Population of Tabular Grin: 97%

This result demonstrates that the Pluronic™ 31R1 seemingly has little effect on the COV of the emulsion, and only a very slight effect on reducing the diameter of the grain. This is in contrast to the dramatic effects observed by Tsaur et al., by Pluronic™31R1 on AgX tabular grain emulsions demonstrated in U.S. Pat. Nos. 5,147,771; 5,147,772; 5,147,773 and 5,252,453.

Example 7 (Control)

Kettle Contents: Gelatine (45 g of Rousselot 1183), water (5120 ml), and potassium bromide (92.8 g, 0.78 mol) was added to a 10 liter kettle to give a solution pBr of 0.82.

Nucleation: The temperature of the kettle solution was brought to 25° C. and the dispersator head was rotated at 4,500 rpm 72 ml of a 2.0M solution of silver nitrate (144 mmol, 3.5% of the total silver added) was added by the single jet technique over a period of 8 minutes.

First Growth Stage: Under pAg control (at −110 mV), 405 ml of a 2.0M solution of silver nitrate (22 1 mol, 55.9% of the total silver added) and the corresponding solution of 2.02M potassium bromide were added simultaneously at a linear rate from 9.0 ml/min to 77.85 ml/min over 25 min and 30 seconds.

Second Growth Stag: A 2.0M solution of silver nitrate was added by a singe jet at pump rate of 14.25 ml/min . to raise the pAg from −110 mV to +65 mV. This required about 18.9% of the total saver added. Ammonia a solution (0.9 mol) was the n added by hand to t he kettle over 20 seconds.

Under pAg control (at −45 mV), 495 ml of a 2.0M solution of silver nitrate (0.99 mol, 24.1% of total silver added) and a corresponding mixture of a 1.94M solution of potassium bromide and a 0.06M solution of potassium iodide were added simultaneously at a rate of 16.5 ml/min. over 30 mins. The emulsion was then cooled to 45° C. and precipitated using procedures well known in the art.

The tabular grain obtain ed by this procedure and had the following characteristics:
Average Grain Equivalent Circular Diameter: 1.04 $\mu$m
Average Grain Thickness: 0.18 $\mu$m (average aspect ratio of 5.8:1)
Coefficient of Variance (COV) for the Tabular grain 38%
(Overall COV for all Grains: 41%)
Projected Area of Tabular Grains: 97%
Population of Tabular Grains: 90%

This emulsion is characteristic in that there are numerous needle-type (rods) grain present, presumably resulting firom nucleating at the significantly lower pBr:

Example 8

Example 7 was repeated, except that poly(THF) block copolymer (P 1) surfactant, having a molecular weight of 2 600 and a lipophilic-hydrophilic-lipophilic arrangement, was additionally present in the reaction vessel prior to the nucleation step (0.40 g). The surfactant constituted 2.6% by weight of the total silver added at the nucleation step and 0.09% by weight of the total silver introduced in the emulsion overall.

The tabular grains obtained by this procedure had the following characteristics:
Average Grain Equivalent Circular Diameter 1.08 $\mu$m
Average Grain Thickness: 0.19$\mu$m (average aspect ratio of 5.7:1)
Coefficient of Variance (COV) for the Tabular grains 28%
(Overall COV for all Grains: 33.0%)
Projected Area of Tabular Grains: 95%
Population of Tabular Grains: 84

It is noteworthy that this emulsion had a significantly reduced number of needle type grains present. Evidently, the grain growth modifier has inhibited their growth somewhat Example 9 (Comparative Example)

Example 7 was repeated, except that Pluronic™ 31R1 (BASF) surfactant having a molecular weight of 3,200 and a lipophilic-hydrophilic-lipophilic arrangement was additionally present in the reaction vessel prior to the nucleation step (0.50 g). The surfactant constituted 3.25% by weight of the total silver added at the nucleation step and 0.11% by weight of the total silver introduced in the emulsion overall.

The tabular grains obtained by this procedure had the following characteristics:
Average Grain Equivalent Circular Diameter: 1.05 μm
Average Grain Thickness: 0.18 μm (average aspect ratio of 5.8:1)
Coefficient of Variance (COV) for the Tabular grains 34% (Overall COV for all Grains: 36%)
Projected Area of Tabular Grains: 97%
Population of Tabular Grains: 92%

There is little effect on the COV of this emulsion with the Pluronic™ 31R1 (BASE) surfactant. It is also noteworthy that this emulsion had many needle type grains present The grain growth modifier had very little effect on inhibiting their growth.

TABLE 1

Characteristics of Low COV Tabular Grain Emulsions

| Example | Block Copolymer Used | pBr at Nucleation | Mean Grain Size (μm) | T-Grain COV (%) | Edge (μm) | A. A. R |
|---|---|---|---|---|---|---|
| 1 (Control) | none | 1.31 | 1.30 | 20 | 0.19 | 6.8:1 |
| 2 | P1 (0.5 g) | 1.31 | 0.97 | 7 | 0.24 | 4:1 |
| 2a | P1 (0.25 g) | 1.31 | 1.10 | 8 | 0.193 | 5.7:1 |
| 3 | P4 (0.5 g) | 1.31 | 0.82 | 12 | 0.34 | 2.4:1 |
| 3a | P4 (0.25 g) | 1.31 | 1.10 | 16 | 0.194 | 5.7:1 |
| 4 | P2 (0.5 g) | 1.31 | 0.83 | 12 | 0.31 | 2.7:1 |
| 5 | P3 (0.4 g) | 1.31 | 1.00 | 10 | 0.206 | 4.9:1 |
| 6 (Comparative) | Pluronic 31R1 (0.5 g) | 1.31 | 1.25 | 18 | 0.18 | 6.9:1 |
| 7 (Control) | none | 0.82 | 1.04 | 38 | 0.18 | 5.8:1 |
| 8 | P1 (0.4 g) | 0.82 | 1.08 | 28 | 0.19 | 5.7:1 |
| 9 (Comparative) | Pluronic 31R1 (0.5 g) | 0.82 | 1.05 | 34 | 0.18 | 5.8:1 |

In Table 1, A. A. R = Average Aspect Ratio

Example 10
Emulsion 10(a) (control

Kettle Contents: Gelatine (12.5 g of Rousselot 1183), water (2160 ml), and potassium bromide (12.6 g) were mixed in a 10 liter kettle to give a solution of pBr 1.31.

Nucleation: The temperature of the kettle solution was brought to 45° C. and 40 ml each of 2M silver nitrate (2.0% of the total silver added) and 2M potassium bromide were added over 2 minutes by balanced double jet technique, with string at 4500 rpm.

Ripening Pause: The temperature was raised to 70° C. over 25 minutes. Twenty minutes into the temperature ramp, a solution of ammonium sulphate (10.0 g, 75.8 mmol) in 2.5M NaOH (80 ml) was added, giving a pH of 10.9. After a further 5 minutes, the kettle contents were neutralised to pH 6.85 with 4M nitric acid, a solution of gelatine (46.0 g) in water (475 ml) was added, and the mixture stirred a further 10 minutes.

First Growth Stage: 2.00M silver nitrate solution (21.6 ml, 1.08% of total silver added) was added at 7.5 ml/min. over 2 min.54 sec. to raise the pBr to 1.63. Under pAg control (at −56 mV), 2.00N solutions of silver nitrate and potassium bromide were added simultaneously at a rate of 7.5 ml/min. ramped linearly to 29.0 ml/min. over 45 minutes, so that a further 1.64 mol silver (40.9% of total) was added.

Second Growth Stage: Single jet addition of 2.00M silver nitrate at 7.5 ml/min. was continued until the mV reading rose to −23 mV. Balanced double jet addition of the same solutions was resumed at 7.5 ml/min., ramp linearly to 37.5 ml/min. over 46 minutes, under pAg control, so that a further 2.17 mol silver (54% of total) was added. After cooling to 45° C., the emulsion was precipitated and washed by standard methods.

Emulsion 10(b) (control)
The same procedure as for 10(a) was followed, but omitting the addition of ammonia (and neutralising acid) during the ripening stage.

Emulsion 10(c) (invention)
The same procedure as for 10(b) was followed, except that polymer P1 (0.15 g) was added to the kettle prior to the nucleation step, and a further 0.10 g was added with the gelatine at the end of the temperature ramp. The quantity of block copolymer surfactant amounted to 2.9% by weight of silver added up to the beginning of post-ripening grain growth, and 0.06% by weight of the total silver in the emulsion.

A three emulsions consisted mostly of regular hexagonal grains, and the characteristics of the three populations are summarised below:

| Emulsion | 10(a) | 10(b) | 10(c) |
|---|---|---|---|
| Av. circular diameter (μm) | 1.38 | 1.20 | 1.20 |
| Av. thickness (μm) | 0.19 | 0.12 | 0.15 |
| Av. aspect ratio | 7.7:1 | 10:1 | 7.8:1 |
| COV (tabular grains) | 23% | 33% | 24% |
| COV (all grains) | 24% | 40% | 25% |
| Tabular grains (by projected area) | 99% | 99% | 99% |
| Tabular grains (by number) | 98% | 90% | 97% |

Comparison of the figures for 10(a) and 10(b) shows the beneficial effect of am ammonia in reducing the proportion of nonconforming grams and in narrowing the grain size distribution. However, the resulting grains are large and proportionately thicker than those prepared in the absence of ammonia The figures for 10(c) reveal that the block copolymer surfactant is comparable to ammonia in its ability to control the grain size distribution and to limit the number of nonconforming grains. The gins are of similar aspect ratio to those prepared using ammonia but are smaller on average.

We claim:
1. A silver halide photographic emulsion comprising tabular silver halide grains and a block copolymer, wherein said block copolymer was present during the preparation of said tabular silver halide grains and is selected from the group consisting of A—B, A—(B—A)$_m$, B—(A—B)$_m$, (A—B)$_p$—X, (B—A)$_p$—X, [A—(B—A)$_m$]$_p$—X, and [B—(A—B)$_m$]$_p$—X where m is an integer of 1 or more, p is an integer of 3 or more, X represents a p-valent linking group, A represents a poly(tetrahydrofuran)block, and B represents a poly(ethylene oxide) block, wherein said poly (tetrahydrofuran) block and said poly(ethylene oxide) block are connected to each other by either a direct bond or a divalent linking group.

2. The silver halide emulsion according to claim 1 wherein one or both of the blocks represented by A and B have a degree of polymerisation in the range 2 to 100.

3. The silver halide emulsion according to claim 2 wherein one or more of the blocks represented by A and B have a degree of polymerisation in the range 5 to 30.

4. The silver halide emulsion according to claim 1 wherein said poly(tetrahydrofuran) block and said poly (ethylene oxide) block are connected to each other by said divalent linking group selected from the group consisting of carbonyl, methylene, phenylenedicarbonyl, phenylenedicarbamoyl, alkylenedicarbonyl and alkylenedicarbamoyl.

5. The silver halide emulsion according to claim 1, wherein said poly(tetrahydrofuran) block and said poly(ethylene oxide) block are connect to each other by said direct bond.

6. The silver halide emulsion of claim 1, wherein said block copolymer is present in an amount of at least 5mg per mole of silver in the final emulsion.

7. A method of making a tabular grain emulsion comprising the sequential steps:

(a) providing a solution of bromide ions and dispersing medium in an emulsion-making kettle;

(b) adding a solution of silver ions to said solution of bromide ions to form a population of silver halide nuclei;

(c) optionally ripening said population of silver halide nuclei;

(d) adding further silver ions and halide ions so as to form a population of tabular silver halide grains; characterized in that prior to step (b) and/or step (d) there is added to the kettle a block copolymer selected from the group consisting of A—B, A—(B—A)$_m$, B—(A—B)$_m$, (A—B)$_p$—X, (B—A)$_p$—X, [A—(B—A)$_m$]$_p$—X, and [B—(A—B)$_m$]$_p$—X where m is an integer of 1 or more, p is an integer of 3 or more, X represents a p-valent linking group, A represents a poly(tetrahydrofuran)block, and B represents a poly(ethylene oxide) block, wherein said poly(tetrahydrofuran) block and said poly(ethylene oxide) block are connected to each other by either a direct bond or a divalent linking group.

8. The method of making a tabular grain emulsion according to claim 7 wherein in said block copolymer one or both of blocks represented by A and B have a degree of polymerisation in the range 2 to 100.

9. The method of making a tabular grain emulsion according to claim 8 wherein in said block copolymer one or both of blocks represented by A and B have a degree of polymerisation in the range 5 to 30.

10. The method of making a tabular grain emulsion according to claim 8 wherein said poly(tetrahydrofuran) block and said poly(ethylene oxide) block are connected to each other by said divalent linking group selected from the group consisting of carbonyl, methylene, phenylenedicarbonyl, phenylenedicarbamoyl, alkylenedicarbonyl and alkylenedicarbamoyl.

11. The method of making a tabular grain emulsion according to claim 7 wherein the bromide solution of step (a) has a concentration in the range 0.3 to 0.001M.

12. The method of making a tabular gain emulsion according to claim 7 wherein the pBr of the emulsion during step (b) is in the range 0.5 to 3.0.

13. The method according to claim 12 wherein the pBr is in the range 0.7 to 1.4.

14. The method according to claim 7 wherein step (c) is carried out in the absence of ammonia.

15. The method according to claim 7 wherein the concentration of said block copolymer is from 5 to 200 mg per mole of silver.

16. The method of claim 7 wherein said poly(tetrahydrofuran) block and said poly(ethylene oxide) block are connected to each other by a direct bond.

* * * * *